United States Patent Office 2,925,287
Patented Feb. 16, 1960

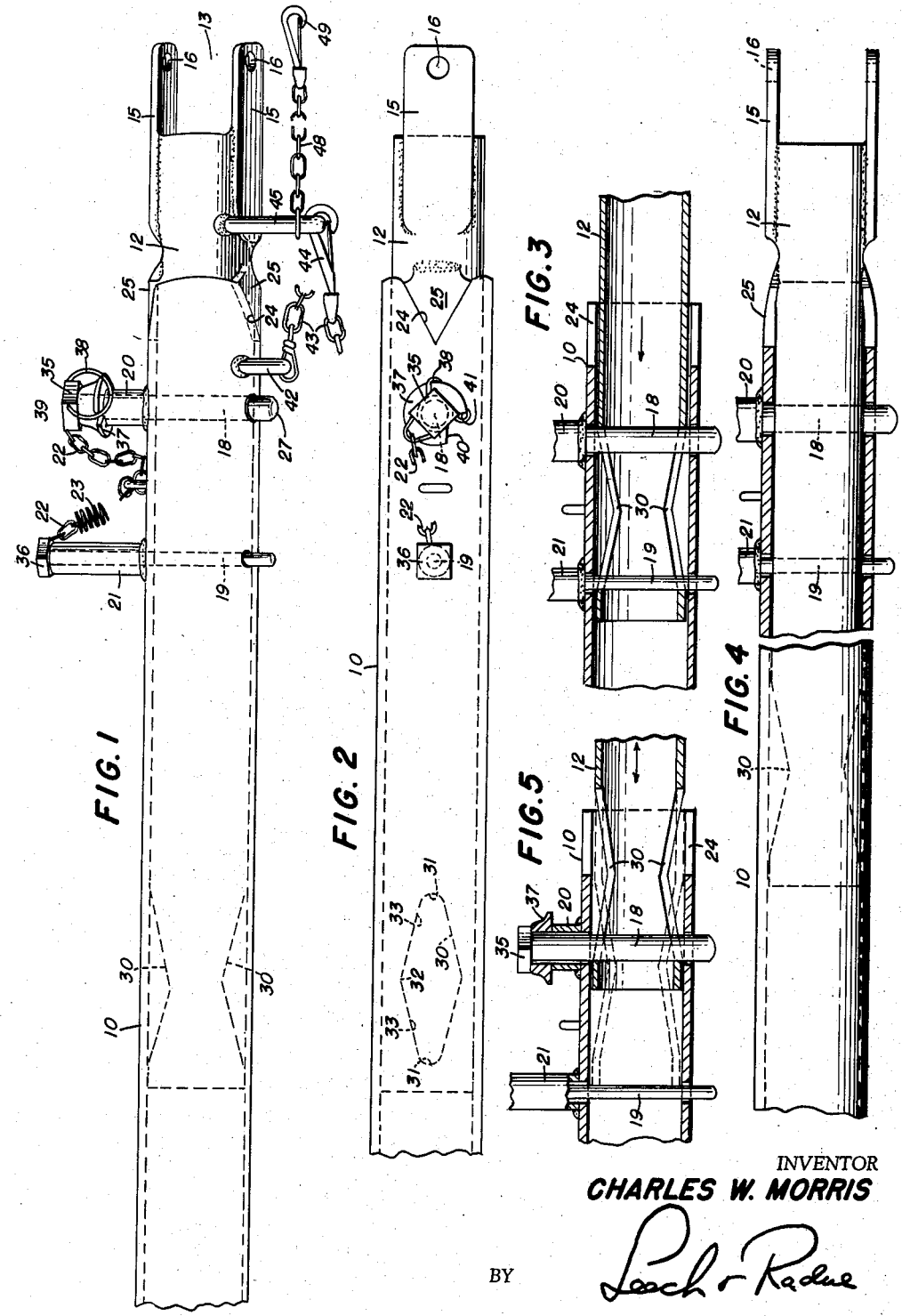

2,925,287
EXTENSIBLE HITCH DEVICE FOR TRAILERS

Charles W. Morris, Paris, Tenn.

Application February 20, 1958, Serial No. 716,388

6 Claims. (Cl. 280—482)

This invention relates to a device for detachable connecting a trailer to a draft vehicle, falls into the general class known as "trailer hitches" and constitutes connectible telescoping components, one for articulated connection to the draft vehicle and the other for rigid attachment directly to the trailer or to its tongue.

It is a general object of the present invention to provide a novel and improved trailer hitch which facilitates the operation of connecting a trailer to a tractor or other draft vehicle and eliminates the need for manually moving the trailer.

More particularly it is an object of the invention to provide a trailer hitch which is extensible to permit couplying without moving either vehicle, after they are initially placed within the range of extension of the hitch, and which provides for automatic connection of the hitch components upon movement of the tractor.

An important object of the invention resides in the provision of telescoping hitch parts, the outer of which is provided with locking pins and guides and the inner with alternative pin receiving openings for automatic coupling of the parts in close or extended arrangement.

Another important object of the invention resides in the provision of means for automatically providing rotative alignment of the hitch components whereby the connecting pins may be gravity positioned in relatively close fitting apertures to eliminate fore and aft play between components while in use.

An important feature of the invention consists in the use of connecting pins, both functioning in either the close or extended hitch arrangement providing thus for increase pin life and reduced danger of separation.

Other and further objects and features of the invention will be more apparent to those skilled in the art upon a consideration of the following specification and accompanying drawing wherein is disclosed a single exemplary embodiment of the invention, with the understanding that such changes and modifications may be made therein as fall within the scope of the appended claims without departing from the spirit of the invention.

In said drawing:

Fig. 1 is a side elevation of a trailer-hitch constructed in accordance with the present invention, the view being taken at a slight angle to the horizontal better to illustrate the several novel features;

Fig. 2 is a top plan view thereof, showing, like Fig. 1 the close coupled arrangement of the telescoped tubes;

Fig. 3 is a fragmentary, longitudinal, vertical section through the connected portions of the coupling tubes when in extended arrangement showing both pins in working position;

Fig. 4 is a side elevation of the whole hitch in close coupled arrangement, illustrating the connected area in longitudinal, vertical section; and Fig. 5 is a view similar to Fig. 3 but illustrating the hitch in maximum extended position, which it might occupy in making a connection, but not in actual use.

In describing this invention the word "trailer" is used to designate any type of vehicle which is not self-propelled and is intended to be drawn by a tractor, automobile or the like, but excludes the so-called "semi-trailer" whose forward end overlaps the specially built tractor having an automatically coupling "fifth-wheel" type of connecting unit. The trailers to which the present invention applies are better designated as of the tongued-towed type and are generally fitted with only two wheels, since many such trailers are of small size and are used by sportsmen and others for hauling a great variety of products and equipment. Where it is necessary to couple such a trailer to an automobile or tractor device, difficulty is often occasioned in making the actual coupling if help is not available. The ground may be rough and irregular so that it is impossible to move the trailer manually to a position where actual coupling can take place, and backing the tractor or other vehicle without being able to see the position of the tongue is hazardous. Therefore, in accordance with the present invention, the hitch is incorporated in the trailer-tongue or attached thereto, and is extensible by telescopic arrangement so that if the vehicle is backed to within a distance equal to the possible length of hitch-extension, coupling can then be made manually and the power vehicle backed to telescope the coupling to its close-fitting position where the coupling pin or other securing means takes hold automatically. As a corollary to this arrangement, it is also possible to use the hitch for hauling the trailer while in an extended position where means is also provided for connecting the two telescopic sections together. This is often helpful with certain types of farm machinery, wagons and the like, when towed, for instance, behind a corn-picker in order to provide the necessary spacing for discharge mechanism to deliver into the towed wagon which carries the picked produce.

Reference should now be had to the drawing for a better understanding of the invention. This drawing shows only the essential parts of the tractor hitch, it being considered unnecessary to illustrate either the trailer or the tractor.

Referring first to Fig. 1, it will be seen that the hitch comprises two main parts, an exterior tubular member 10 which may be a part of the tongue of the trailer, an extension thereof or a separate element attached thereto, and a telescoped inner member 12, having means 13, at its forward end for attachment to the tractor or other towing vehicle. These two parts are each preferably tubular and closely telescoping, the second within the first. The tubes may be of any desired cross-section readily available, such as triangular, square, rectangular or the like, but by preference, they are both cylindrical. The tuebs are arranged so that 12 telescopes within 10 with a reasonably close working fit and is of considerable length, giving a selection of close coupled or extended hitching, the length being a matter of choice and variable within wide ranges for different uses. The inner tube 12, is provided at its forward end with some suitable means for attachment to a fitting on the tractor provided for the purpose, and, as shown exemplarily has a pair of spaced, longitudinally extending tongues 15, forming a clevis, the arms of which are perforated as at 16, to receive a coupling pin for attaching it to a suitable companion element (not shown) on the tractor or automotive vehicle.

To secure the two telescopic portions of the hitch together resort is had to one or more coupling pins 18, 19, sized to each pass diametrically and preferably vertically, through a pair of diametrically disposed openings in the outer sleeve and a corresponding aligned pair in the inner sleeve, the pin being long enough to project through the bottom as shown. In order that the pins may be gravity-fed into position as the tractor is backed onto the trailer, to telescope the tubes, after connecting the part 12 to the former, a sleeve 20, 21 is appropriately secured coaxially to each upper hole in the outer tube and extends as shown to form a guide to hold the pin while its lower end rides on the surface of the inner tube as adjustments are being made. Each pin is shown as tethered by means of a chain 22, to an eye welded to the outer tube to prevent loss. If desired, such chains may have a helical spring inserted for instance, at 23, to provide a slight downward pull to insure the entrance of the pin into the holes when the tubes are properly positioned relatively both longitudinally and rotatively. The rotative positioning operation, which is not necessary if the tubes are non-circular, is effected quite simply by notching the end of the outer-tube at one or more positions as shown, with V-shaped notches 24, and providing correspondingly shaped lugs 25 on the inner tube as illustrated thus when the lugs are pushed tightly into the notches, the tubes are stopped with the proper degree of telescoping for aligning the holes in the inner and outer portions and appropriate rotation is given to one tube in respect to the other for circumferential alignment. Enough looseness exists in either the attachment of the tongue to the trailer or of the clevice to the tractor to permit this, and motion, even beyond this range may be achieved by compression of one spring or the other of either the tractor, trailer, or both.

When the aligning devices 24, 25 are engaged the hitch is in the so-called close-coupled position and the two pins, being gravity fed, are in the aligned openings in the inner and outer tubes, providing a tight connection of double strength because of the use of the two pins. Two pins provide greater strength than one of larger diameter because of less reduction in cross-section of the metal of the tubes. In order to insure against the first pin 18 dropping into the openings in the inner tube designated for pin 19, as the parts are being brought together for the close-coupled position, pin 18 is larger in diameter than pin 19 and its end is quite blunt, as illustrated at 27, so that it readily passes over the smaller opening in the inner tube arranged to accept the smaller diameter pin 19.

For extended coupling the pins 18 and 19 remain in their same position in the forward end of the outer tube but are accepted into specially shaped slots 30 in the after end of the inner tube. These slots, like the holes in the forward end of the tube, are vertically positioned, one above the other, and each has a small width 31 at each end, substantially equivalent to the diameter of the corresponding pin, but from these positions toward the widened center portion 32, each slot gradually widens as at 33 in substantially a straight line, although the exact shape of this slot arrangement is immaterial. The widened area 32 permits at least one of the pins to drop into position providing a temporary coupling, and if it is the rearmost pin 19, then tension applied to the hitch by pulling forward with the tractor will cause the pin to be positioned, at the rear of the opening 30, and simultaneously to rotate one or the other of the tubes for proper slot and hole alignment so that the other pin 18 can automatically drop into position. The overall lengths between the ends 31 of the slots is such that the pins fit closely against the ends of the slots, thereby preventing any relative fore and aft movement as the trailer is drawn over rough ground. They also prevent any reciprocation when the brakes are applied.

If, in making the initial coupling in the extended position, only the pin 18 is dropped into position as shown in Fig. 5, then with the pin 19 in its uppermost position, or completely removed, the tractor may be backed toward the trailer until pin 18 seats in the forward end of slot 30 and produces the proper rotation for hole and slot alignment. Now the pin 19 may be dropped in the rear position where it must fit accurately because of the slot and hole aligning operation effected by the forward pin.

Fig. 3 shows the condition when the hitch is properly coupled in the extended position, while Figs. 1, 2 and 4 illustrated it in the close-coupled position.

Each of the pins has a suitable head 35, 36 thereon which engages with the top of the tube 20 or 21 to limit the downward movement of the pin by gravity or under the action of a spring or manual pressure.

In operation over extremely rough territory, such as might occur on plowed fields with farm implements as trailers, there may be some tendency to bounce the locking-pins out of their connecting relationship. The one numbered 19 is designated as having a helical spring at 23 which serves to keep the chain 22 taut enough to insure against this action, but where it may be preferable to have the chain more loosely arranged some means for directly securing the pin in position is found desirable. In the present instance this is effected by securing a suitable radial flange 37 near the upper end of tube 20 and providing a coupling ring 38 on the pin adapted to fit over the flange to hold the pin in position. In the present instance a pair of parallel holes 39 are drilled through the head 35 and a length of spring wire is coiled into the ring 38, with overlapping ends which pass through these parallel holes and because of their curved condition, hold the ring 38 either in the downwardly deflected position shown in Fig. 1 or in an upwardly deflected position because of their reaction with the walls of these bores 39. To facilitate locking the ring over the flange, the latter may have a cut-away or notched portion, as indicated at 40, so that the ring may fit over the point 41 better to hold the pin in position.

The traffic laws of most States require safety chains in connection with trailer hitches, so that should the pins bounce out, break off or become worn through, the trailer cannot separate from the tractor and perhaps cause a serious accident. Such laws require a flexible connection from the trailer tongue continuously to the rear of the towing vehicle. In accordance with the present invention this is taken care of in an ingenious manner by providing a semi-circular loop 42 welded near the forward end of the tube 10 and having a chain 43 attached thereto and of such a length that when the snap 44 at its forward end is hooked into the larger semi-loop 45 welded to the smaller diameter tube just forwardly of the alignment devices, the hitch may be operated in its extended position with the chain 43 substantially taut. This, however, connects only the two parts of the hitch. To provide against difficulty should the pin through openings 16 be lost, a second chain 48 is shown having one end attached to the half-ring 45 and provided with a snap 49 for attachment to some portion of the tractor independent of the trailer hitch. This provides, via the ring 45, a complete chain from tractor to trailer, capable of handling the tow in spite of any type of accident to the hitch itself. When using the hitch in the close position, it is preferred to remove snap 44 from ring 45 and pass the chain 43 with its snap through the half-ring 45 in an obvious manner and to then use the snap 44 for attachment to the tractor. This may be in addition to chain 48 and its snap 49.

It will be obvious from the above that the device of this invention is capable of a wide range of uses and since it can be made in many sizes, can be adapted for any equipment capable of using a conventional hitch, with the added advantages explained for hitches of the type of the present invention.

I claim:

1. A trailer hitch comprising in combination, telescoping tubes having circular cross-section, one arranged for rigid attachment to a trailer in axial alignment with its path of movement, the other having means for pivotal attachment of the projecting end thereof to a tractor, a pin for coupling said tubes together in either extended or close-coupled condition, the outer of said tubes having vertically aligned openings through opposite walls to pass said pin with close fits, aligned holes through opposite walls of the inner tube to also receive said pin with close fits when the tubes are in close coupled condition, means on said tubes interfitting when approaching and at the close coupled position to relatively rotate the tubes and align the holes and the openings to receive said pin, opposite openings in the walls of the inner tube remote from the holes therein and for alternative use in said extended condition, at least one of said opposite openings being a longitudinal slot having end portions complementary to the coupling pin and intermediate tapered wall portions diverging to a widened central portion, whereby to receive the coupling pin with facility, said pin and the tapered portions of the walls cooperating to relatively rotate the tubes to orient them if necessary when the tubes are extended or contracted to the maximum allowed by the coupling pin.

2. The hitch as defined in claim 1 in which a second pin parallel to the first may pass through the outer tube at a distance equal to the length of said slot to engage the opposite end of the latter from the first pin to prevent relative tube movement when the tractor-trailer combination is moving with the hitch extended.

3. The hitch has defined in claim 2 in which the inner tube has a second hole spaced from the first, at the close coupled position, a distance to receive the second pin when the first is in the first mentioned holes.

4. The hitch as defined in claim 3 in which the first mentioned pin is larger in diameter than the second and the holes for each are correspondingly sized, the pins being generally vertical when the hitch is in use and the corresponding holes therefor being sufficiently loose for gravity feed of the pins therethrough when alignment is proper, the two sizes of pins and holes being so sequentially arranged that the proper pins will be gravity received in only the holes intended for them as the hitch tubes are moved toward close-coupled position.

5. The hitch as defined in claim 1 in which a safety chain is connected to one of the tubes, an eye on the other tube and a snap on said chain to be engaged in said eye when the hitch is extended or to pass through the eye for connection to the tractor when the hitch is in close coupled condition.

6. The hitch as defined in claim 5 in which a second chain is secured to said eye and has a snap on the other end for engaging the tractor to provide a continuous chain connection when the hitch is extended.

References Cited in the file of this patent

UNITED STATES PATENTS

| | | |
|---|---|---|
| 2,179,439 | Trow | Nov. 7, 1939 |
| 2,415,479 | Forney | Feb. 11, 1947 |
| 2,423,799 | Shelstad | July 8, 1947 |
| 2,446,223 | Forney | Aug. 3, 1948 |
| 2,514,594 | Weiler | July 11, 1950 |